Nov. 20, 1928.  G. B. COLLIER  1,692,628
INTERNAL COMBUSTION MOTOR
Filed Dec. 2, 1925  6 Sheets-Sheet 5
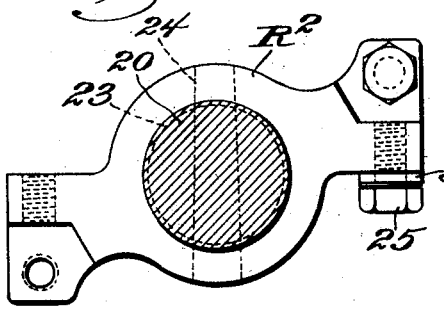
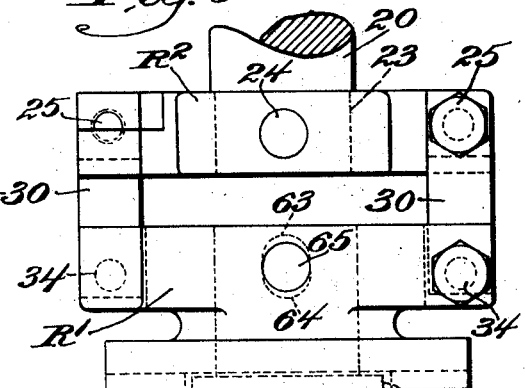
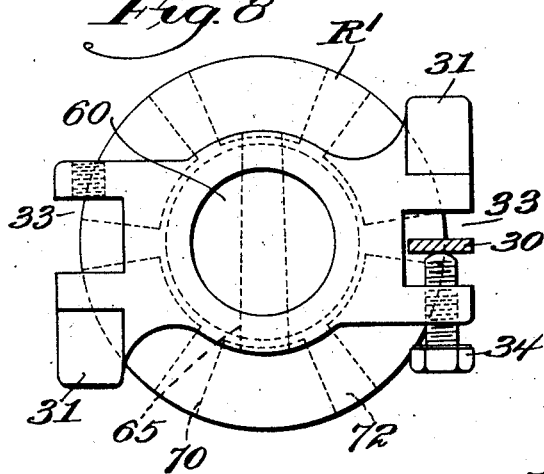
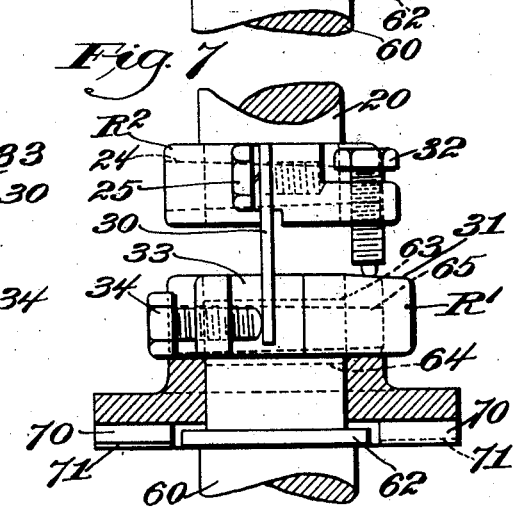
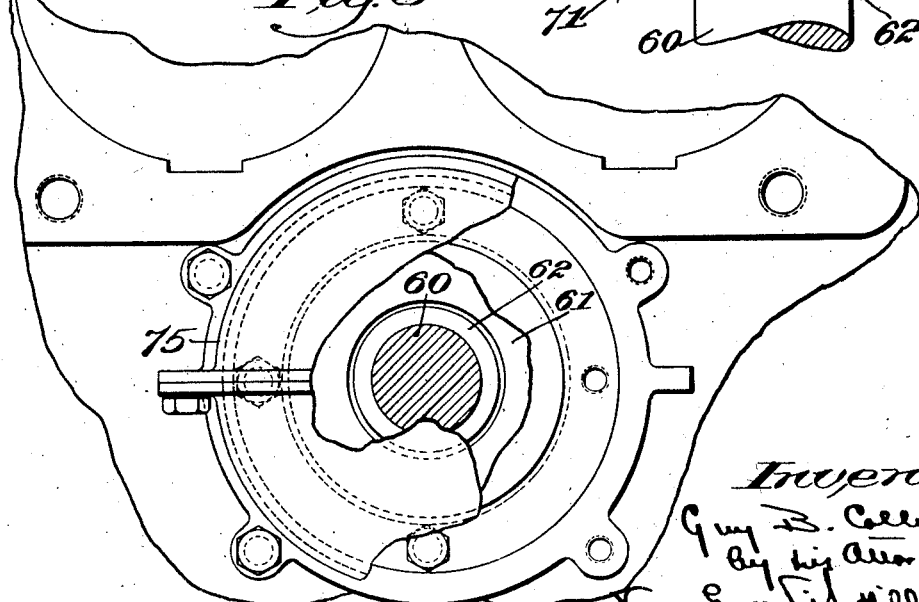

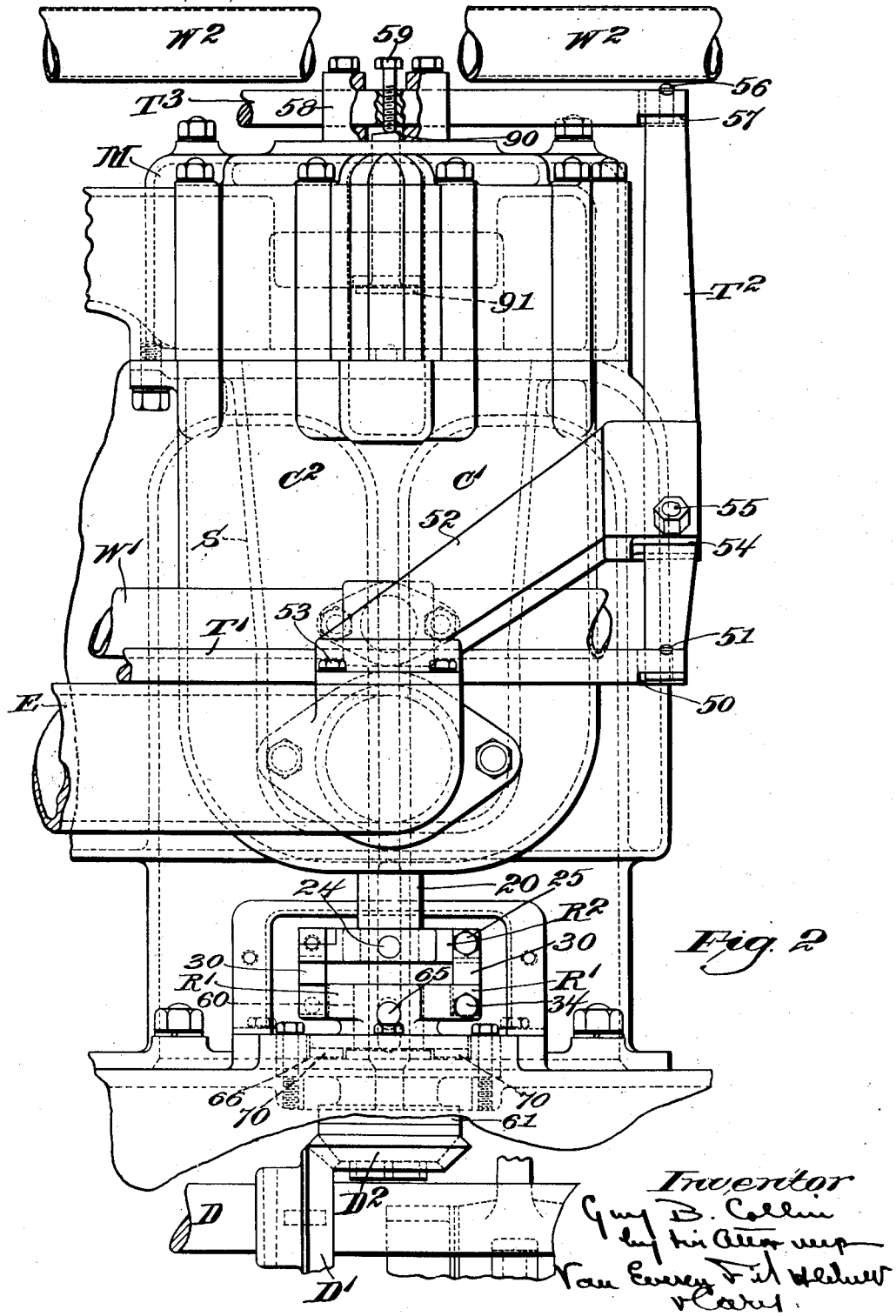

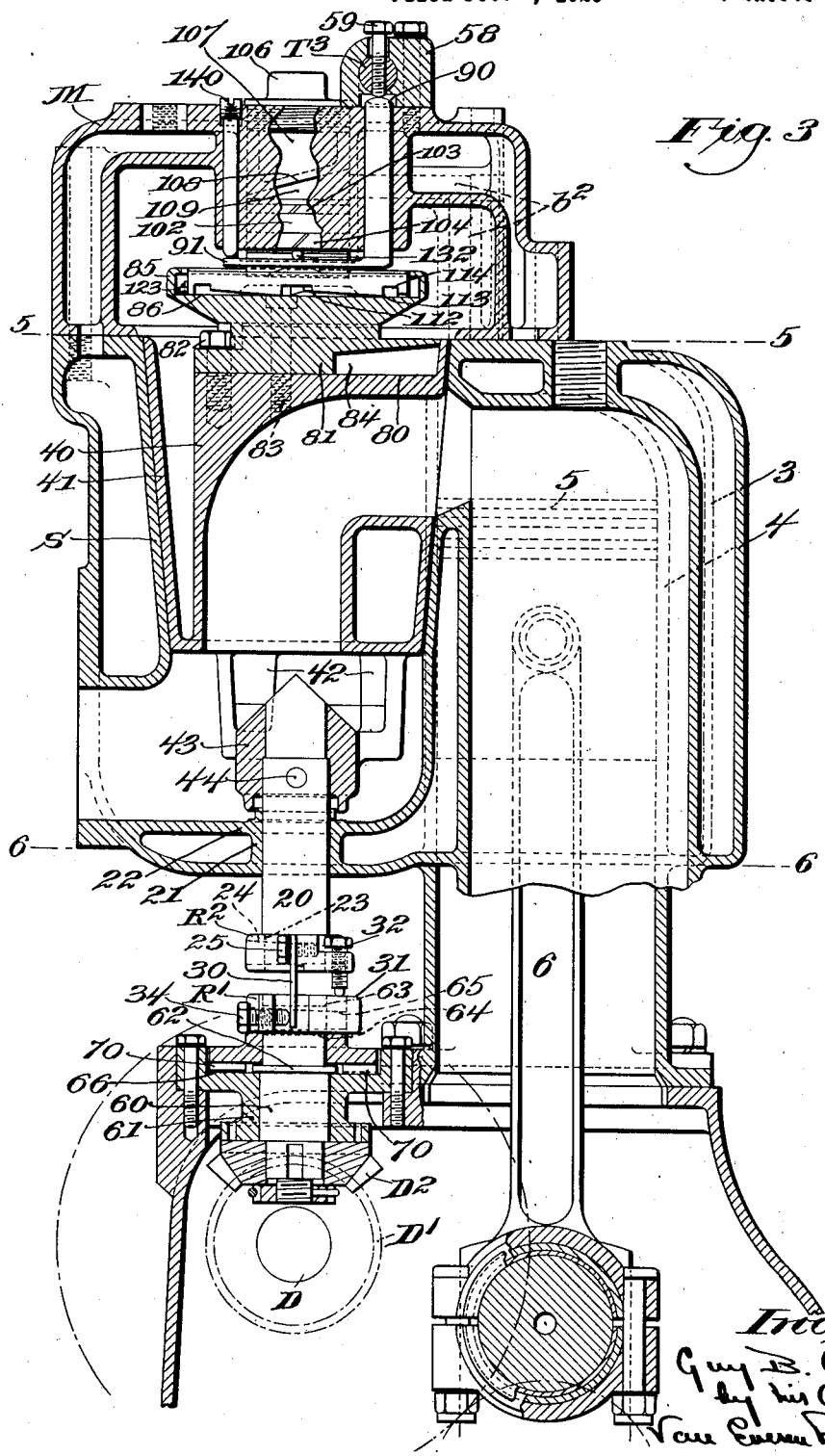

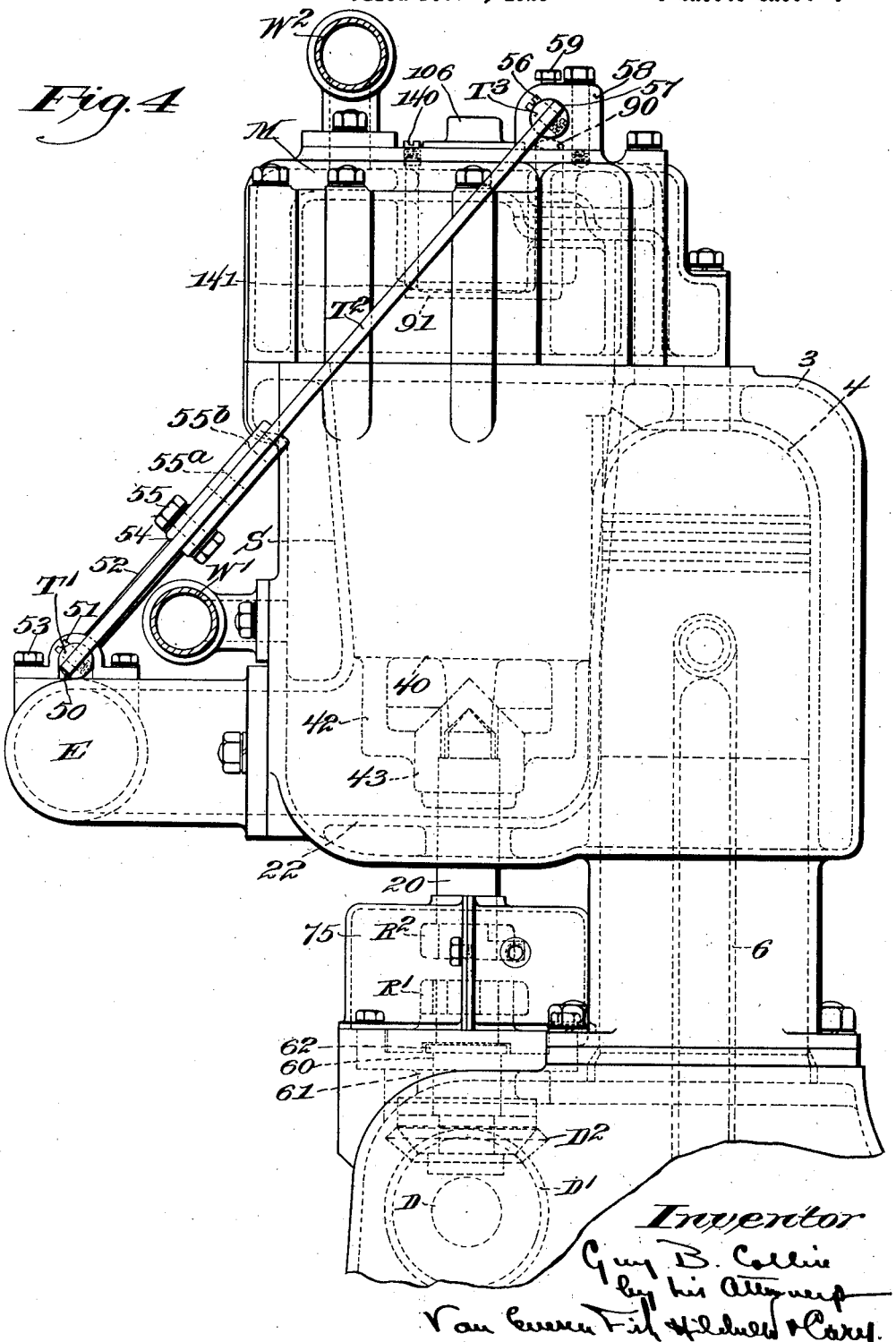

Nov. 20, 1928.
G. B. COLLIER
1,692,628
INTERNAL COMBUSTION MOTOR
Filed Dec. 2, 1925          6 Sheets-Sheet 6
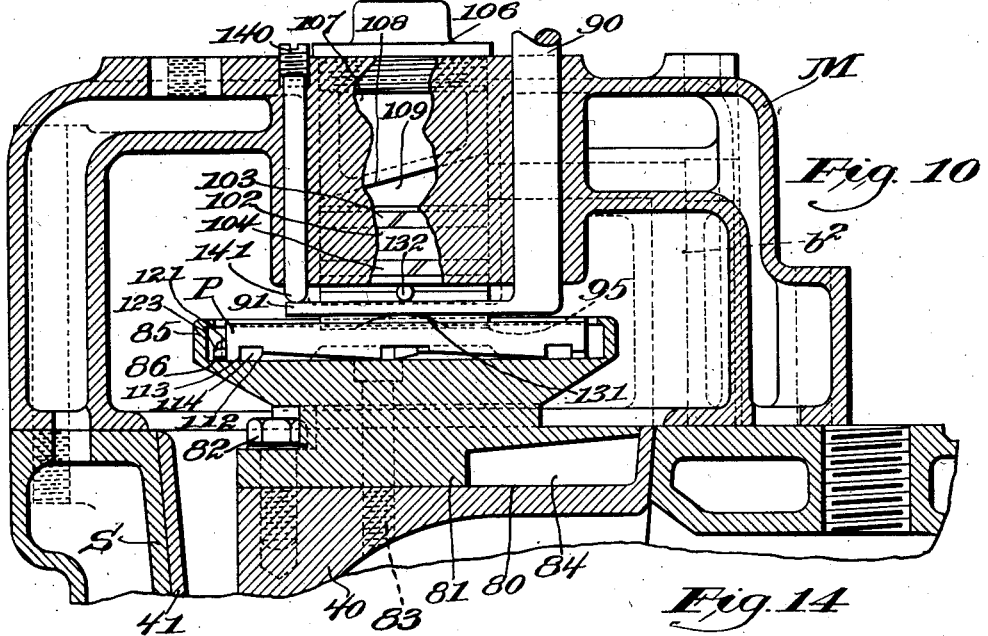
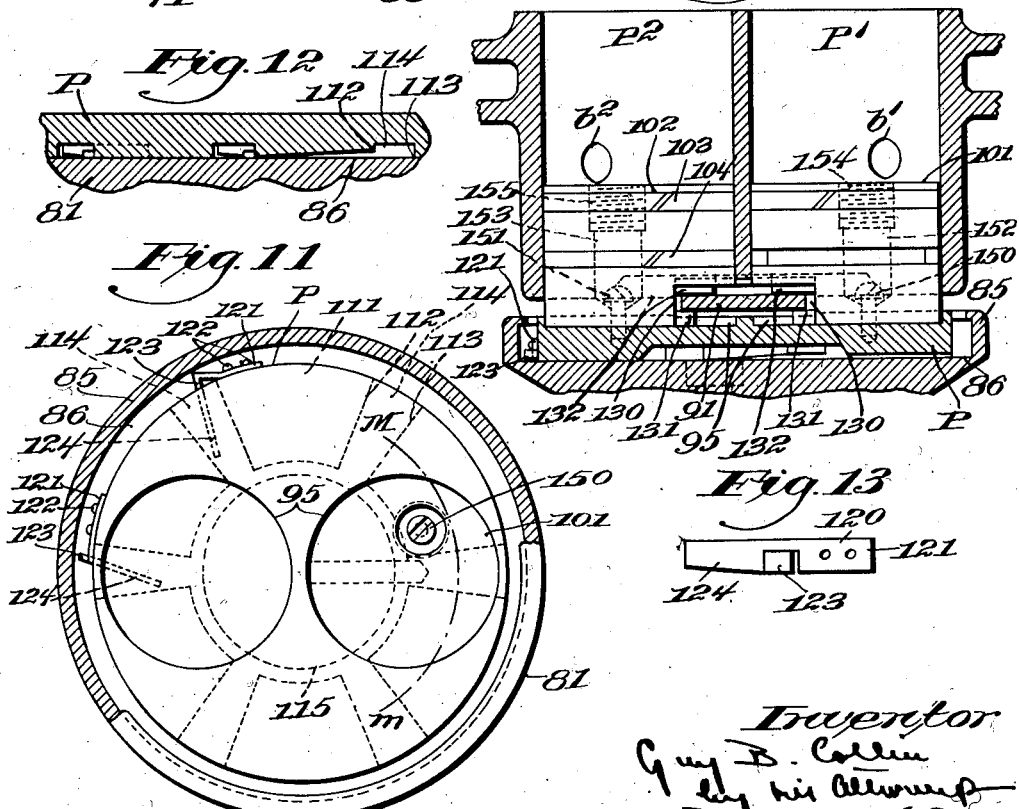

Patented Nov. 20, 1928.

1,692,628

UNITED STATES PATENT OFFICE.

GUY E. COLLIER, OF KINDERHOOK, NEW YORK.

INTERNAL-COMBUSTION MOTOR.

Application filed December 2, 1925. Serial No. 72,653.

The present invention relates to internal combustion motors and more particularly to motors of this type employing rotary valve mechanism for controlling the flow of gas to and from the cylinder. This general type of construction is disclosed in my prior Patent No. 1,040,277, dated October 8, 1912. In this construction a conical valve rotates within a chamber and controls each two adjacent cylinders of the motor. The valve is balanced axially against pressures tending to lift it from its seat by the application of pressure on top of the valve which changes synchronously with changes of pressure in the cylinders. This form of construction affords an adequate balacing medium during the compression, explosion and exhaust strokes of the pistons, but does not function as a balancing medium during the suction stroke of the pistons. It is accordingly one feature of the present invention to improve and reorganize apparatus of this type, so that the valve is maintained in close contact with its seat during the entire cycle of operations of the motor, without, on the other hand, being forced so tightly into engagement with the seat as to cause undue friction and wear.

A further feature of the present invention contemplates the provision of mechanism for automatically relieving the pressure, tending to force the valve against the seat as the valve expands due to increase of temperature in the continued operation of the motor.

A still further feature of the present invention contemplates the provision of mechanism for automatically lifting and easing the valve from its seat in the event that the torsional driving strain exceeds predetermined limits on account of undue friction between the valve and adjacent seat. Still further features of the present invention will be more particularly pointed out in the following description.

In the accompanying drawings illustrating the preferred form of the invention, Fig. 1 represents a partial top plan view of an internal combustion motor with the cooperating rotary valve mechanism;

Fig. 2 is a side elevation of the construction shown in Fig. 1;

Fig. 3 is a section in elevation of the construction shown in Fig. 2 taken upon the line 3—3 of Fig. 1;

Fig. 4 is an end elevation of the construction shown in Figs. 1 and 2;

Figure 1:
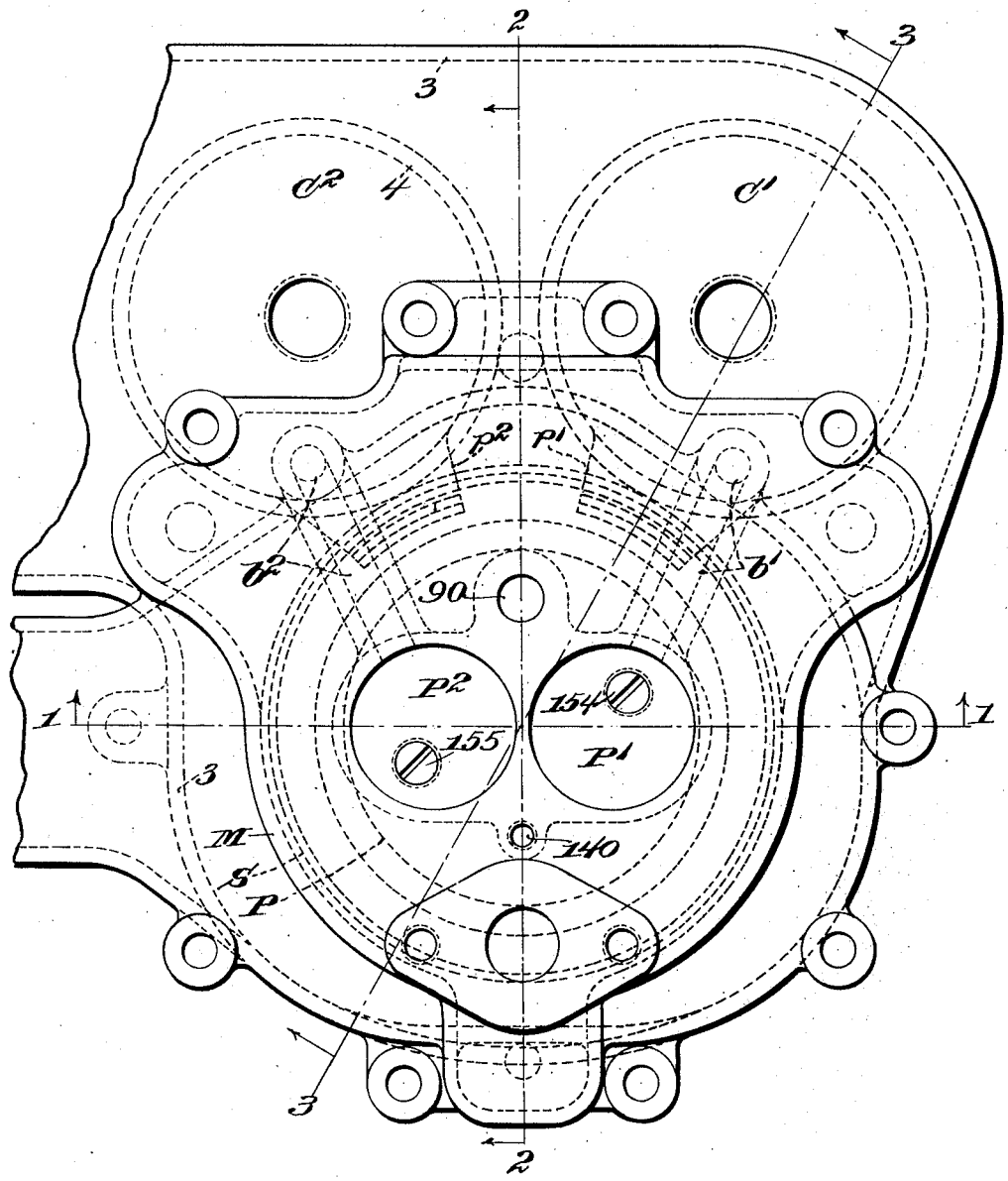

Figs. 5 to 8, inclusive, are details illustrating views of the driving elements;

Fig. 9 is a plan view partially in section of the driving elements with the enclosing housing broken away;

Fig. 10 is a detail illustrating an enlarged vertical section of the head shown in Fig. 3, showing means for applying axial pressure to the valve;

Fig. 11 is a detail illustrating a plan view partially in section of a portion of the mechanism shown in Fig. 10;

Fig. 12 is a detail illustrating the bearing for supporting the balance plug;

Fig. 13 is a detail illustrating one of the oil deflectors; and

Fig. 14 is a detail illustrating a section showing the balance plugs of the cooperating shoe.

In the illustrated embodiment of the invention, Fig. 1 represents a top view of the first pair of cylinders $C^1$ and $C^2$ of a six-cylinder engine, showing also the valve manifold cap M situated partly over the cylinders and partly over the water jacketed valve seat S; $P^1$ and $P^2$ indicate the ports leading to the cylinders $C^1$ and $C^2$ through which the intake and exhaust gases pass, while $P^1$ and $P^2$ denote the balance plug chambers which receive the gas pressure from the cylinders by means of the passages $b^1$ and $b^2$, as a result of which the synchronous balancing of the valve is effected during all except the suction stroke. The pressures in $b^1$ and $b^2$ are transmitted to a plug shoe P situated just beneath them and resting on top of a member attached to the top of the valve and explained further in detail.

On Fig. 1 the following reference lines 1—1, 2—2, 3—3, denote where vertical sections are made and the direction in which the view is to be taken to illustrate and explain certain important features of the gas cooled valve system.

Fig. 2 shows an exterior side elevation of the cylinders $C^1$ and $C^2$, the valve seat S and the intake manifold cap M. In this figure is indicated the valve driving shaft D and the driving gears $D^1$ and $D^2$, of which the latter is connected to the lower member $R^1$ of the release drive, whereas the upper member $R^2$ of the release drive is connected to the valve stem 20, as further illustrated in Fig. 3.

E denotes a part of the exhaust manifold of the engine. $W^2$ indicates the water outlet, while $W^1$ denotes the inlet water passage for supplying the water jackets of the motor.

$T^1$ denotes part of an expansion rod, the left end of which is suitably fastened to the left end of exhaust manifold E. Lever $T^2$ is connected to the right end of $T^1$, which is movable by means of a suitable slot 50 and pin 51. This lever $T^2$ is fulcrumed in a member 52 suitably fastened, as is indicated at 53, to the exhaust manifold and through the junction at 53 member $T^1$ passes with a suitably loose fit. Member 52 is bifuricated as indicated at 54, and bolt 55 constitutes the fulcrum. The upper end of $T^2$ is pivoted by 56 in a slot 57 provided in the temperature adjustment rod $T^3$. On top of the valve manifold cap is a suitable guide member 58 for each pair of cylinders through which $T^3$ passes, while 59 is an adjustable cap screw which contacts with the inclined upper surface 90 of the cylindrical stem of the flat plug spring 91. The foregoing members operate as follows: As the engine warms up to its various working temperatures, the right-hand end of the rod $T^1$ moves slightly to the right and acting on the lever $T^2$ it causes the rod $T^3$ to move slightly to the left and consequently 59, moving slightly to the left, permits 91 a very slight vertical movement which results in the horizontal part of the flat plug spring 91 rising a very small amount but sufficient to provide for the vertical rise of the valve 40. This rise of the valve 40 is due to the fact that its external shell 41 operates at a higher temperature than the valve seat shell S, and as these are made frusto-conical in shape the valve 40 consequently rises as it warms up to various working temperatures. From this it will be seen that unless the spring 91 is given an opportunity to rise slightly, it will press the valve harder on the seat S when the valve is hot than when the same is cold.

Fig. 4 shows an exterior end elevation of the upper part of a motor embodying the features of this invention. In order to secure a proper movement of the temperature adjustment rod $T^3$, with reference to the design of 59 and the upper slanting surface of the vertical part of the plug spring 90 with reference to the design of the rod $T^1$ which receives its heat from the exhaust manifold E, it may be necessary to have the fulcrum bolt 55 located in positions $55^a$ or $55^b$, which are previously clearly indicated in the bifurcated parts 54 of member 52 and shown in Fig. 4.

Now from the foregoing description relating to Figs. 2 and 4, it is clear that as the engine cools down from its higher load working condition to a lower load, and also with a case where it cools down to atmospheric conditions, the rod $T^1$ will contract to its initial state and its action on $T^3$ by way of lever $T^2$ will result in $T^3$ moving slightly to the right, as a result of which member 59 will cause the plug spring 90 and its horizontal part 91 to be depressed to substantially its initial starting point. From the foregoing it is clear that the members $T^1$, $T^2$, $T^3$, 59 and 90, as previously described and arranged, serve to regulate a slight movement of 91 and consequently serve to maintain its balancing pressure on top of the valve at the desired magnitude.

Fig. 3 illustrates the action described for temperature adjustment of the spring 91 with reference to its action on the valve 40 and also brings out the action of the release driving members $R^1$ and $R^2$ in connection with the above-mentioned spring action. The part of Fig. 3 above the line 5—5 is a vertical section taken on the line 2—2 of Fig. 1. The part of Fig. 3 between the line 5—5 and the boundary 6—6 is a vertical section taken on the line 3—3 of Fig. 1. The part of Fig. 3 below the boundary 6—6 is a part vertical section of the lower part of the engine taken on a line 2—2 of Fig. 1. The dot-and-dash outlines of the water jacket wall 3, cylinder wall 4, piston 5 and connecting rod 6, as shown in Fig. 3, indicate these positions in the vertical plane through the line 2—2 of Fig. 1.

At the lower end of valve 40 is a four-arm spider 42 which is part of or is fastened to the bottom of the valve shell 41, as shown in Figs. 3 and 4. A boss 43 connects with the arms of the spider, and through this passes the valve stem 20 which is securely fastened by a pin 44 in connection with which a key-way and key may also be provided. A shoulder construction is provided, as indicated, so that it can readily carry any downward thrust which may be due to the valve. 20 passes through a loose-fitting bushing 21 in the bottom part of the valve housing 22, as shown in Figs. 3 and 4. The lower end 23 of stem 20 fits into the member $R^2$ of the release drive which is driven by member $R^1$ by means of spring 30 which connects these members, with reference to rotation while the inclined surface 31 of member $R^1$ serves to raise the stem 20 of valve 40 by its contact with the adjustment cap screw 32. Parts relating to these constructions will be described later in further detail. If for any reason the valve presses harder on its seat than it normally should, the resistance to rotation will be increased over the normal amount, and this will cause an increased deflection in the spring 30, thus causing 32 to move slightly up the incline 31, and thus a slight lift will be given to the valve 40, releasing the same and causing it to return to normal working conditions.

A shaft 60 is suitably keyed and otherwise fastened to the gear $D^2$ which meshes with driving gear $D^1$. Member 61 constitutes a thrust and cylindrical bearing member for shaft 60 and for the bottom of gear $D^2$, collar 62 and shaft 60 serving to keep this bearing in correct position with reference to member 61. The upper end of shaft 60 has an oblong hole, the top and bottom lines of which are indicated by 63 and 64 and through which pin 65 passes, thus securing member $R^1$ to shaft 60 so that the two must rotate as one unit, but this permits member $R^1$ to slightly rise or fall with reference to shaft 60. The bottom part of member $R^1$ has preferably six thrust pads shaped so that it will rotate on tapered oil films formed between these pads and the bearing surface 66 of member 61. This results in the surface 66 of member 61 carrying any axial thrust which may come upon the release member $R^1$ by way of the release member $R^2$ in connection with driving the valve, whereby any undue pressure of the valve on its seat will be relieved and whereby power required to rotate the valve will be kept at a low and efficient working value. Detailed features relating to the previously mentioned part will be given in further detail.

Fig. 5 shows a top view of member $R^2$, giving a cross-section of the valve stem 20 and its shoulder construction 23 which enters $R^2$ and is fastened throughout by means of a pin 24. The upper end of spring 30 is fastened to member $R^2$ by means of a suitable cap screw 25. This member is symmetrical and another spring applies to its opposite side, as is clearly shown in Fig. 6, giving a side elevation of the member $R^2$ and also $R^1$.

In Fig. 6 is shown an end elevation of the members $R^2$ and $R^1$, which further illustrates the detail and shows spring 30 acts as a cantilever spring by means of which the member $R^2$ rotates the member $R^1$.

Fig. 8 is a plan view showing the inclined surface 31 and the recesses 33 formed in this member through which the lower part of spring 30 passes with space for timing adjustment of the valve by means of two suitable cap screws 34 shown in Figs. 6 and 8. The timing provisions are effected as follows: For example, the valve is to be set so that its exhaust port opens when the piston is down a certain distance. With this arrangement member $R^2$ is conveniently located and fastened to the shaft 20 by means of the pin 24. The next step is a convenient fastening of member $R^1$ to shaft 60, and its position relative to member $R^2$ is secured by adjusting the meshing of the teeth in the gears $D^1$ and $D^2$ and the adjustment of the cap screws 34 with reference to just contacting with the spring 30, as is indicated in Figs. 6, 7 and 8.

Fig. 7 illustrates on a large scale the oblong-shaped hole bounded at its top and bottom by elements 63 and 64 through which pin 65 passes, thus securing member $R^1$ to the shaft 60 so that it rotates with the latter. This construction permits $R^2$ any slight vertical movement that may be necessary to carry the vertical thrust without the same acting on the pin 65.

On the lower surface of member $R^1$ are preferably six thrust pads 70 shown in plan in Fig. 8, whose leading edge in the direction of rotation is slightly raised over its lagging edge as indicated by 71 in Fig. 7, the bottom part of which shows a section taken through two passage regions 72 of Fig. 8. The object of this construction is to secure the formation of tapered oil films between the bottom surface of the pad 70 and the top bearing surface 66 of member 61, as indicated in Figs. 3 and 7. In the recesses 72 between the pad 70 oil deflecting devices may be inserted as will be described later in detail in connection with Figs. 11, 12 and 13. The action of this construction results in a minimum friction loss in the rotating member due to such axial thrust as may have to be carried by member $R^1$ in effecting its release drive on to member $R^2$ in connection with the axial balancing of the valve.

Fig. 9 shows a plan view in part of a housing 75 which surrounds the release driving members $R^1$ and $R^2$ and within which suitable lubrication provisions can be secured and the exclusion of dirt and dust thus effected from the working members, the main construction features being indicated in Figs. 4 and 9, the arrangement being such that the working parts may readily be gotten at by the removal of a few cap screws indicated in the construction.

Fig. 10 is a vertical section on the line 3—3 of Fig. 1, wherein is shown the upper part of the valve 40 and its shell 41 as resting on the valve seat shell S. On the upper finished surface 80 of this member is securely fastened a member 81 by means of suitable bolts 82 and screws 83. The bottom surface of member 81 only occupies a part of the area of surface 80, thus leaving the passageway 84 for a part flow of the incoming gases for the cylinders, the same being fully described and explained in my copending application relating to my improved form of gas cooled valve. The upper part of member 81 extends up into the manifold cap M and is recessed at its top portion, having a thin cylindrical rim 85 which serves to retain a supply of oil and a bottom finished surface 86 which constitutes the lower surface of the thrust bearing between the plug shoe P and this member 81 by means of which the thrust is communicated to the valve 40 and vice versa. Oil is admitted and withdrawn from this thrust bearing chamber by any suitable means not shown in detail.

Fig. 11 shows a top view of the member 81 and its oil retaining wall 85 together with a top view of the plug shoe P shown in assembled position. In the upper surface of P are two circular recesses 95, in one of which is shown the top view of balance plug 101 belonging to cylinder $C^1$ which will be described later. On the bottom surface of P are preferably six thrust pads 111, as indicated by the dotted outline in Fig. 11, leading edges 112 of these pads toward which rotation of the member 81 is taking place are slightly raised with reference to the lagging edges 113, which construction facilitates the formation of tapered oil films between the pads surface and the surface 86 of member 81. This construction is further illustrated in Fig. 12 which is a part section of member 81 and plug shoe P taken on the circular arc M—m, as indicated in Fig. 11. Between the thrust pads 111 are open spaces or recesses 114 into which are conveniently placed oil deflectors 120, illustrated further in Fig. 13. The bottom central region 115 of the plug shoe is made circular and serves to momentarily hold any excess oil that the deflectors may throw into that region from which it is afterwards diverted by centrifugal force toward the thrust pads 111. The oil deflector consists of a thin strip, part 121 of which is bent to conform to the outer surface of the plug shoe P and fastened throughout by suitable pins 122. Part 123 of these deflectors extends a short distance beyond the periphery of P and serves to scoop out the oil (which is thrown by centrifugal force against the inner wall of shell 85) and divert it into the regions 114 so as to distribute the same underneath the leading edges 112 of the thrust pads 111. For this reason part 124 is made with a slight taper so that only a little oil will go directly to the edge 112 near its outer radius, while the balance will go to the edges 112 near their inner radius which with the action of the centrifugal force will serve to give the desired tapered oil film between the thrust pads 111 and the surface edge 86 of member 81.

In Fig. 11 are shown two slightly different constructions by which the part 123 of the oil deflector 120 is maintained in its working position. If it is desired to have the outer end 123 come very close to the inner wall of 85, it will then be necessary to make certain small recesses in the top rim of 85 in order that the plug shoe with its oil deflectors may be inserted therein.

Balance plug 102 belonging to cylinder $C^2$ is indicated in Fig. 10 which shows its working position inserted in recess 95 in plug shoe P. The balance plug is recessed at its lower end, as indicated by 130 in Fig. 14. This construction is necessary in order to admit flat plug spring 91 and parts directly related to it. In forming the recess 130 in each of these plugs, the portion 131 is left in the form of a circular arc, as shown in Figs. 10 and 14. This constitutes a bearing surface on which the bottom part of 91 rests so that any pressure desired by 91 to be transmitted to the valve or to be absorbed by it from the valve is communicated to 91 at its contact with member 131. Just at the top surface of 91 is a bearing pin 132 which is securely fastened within each plug. This pin constitutes a point of application of any force which the plug 101 for cylinder 1 and 102 for cylinder 2 may transmit to the spring. The synchronous balancing pressure given to these plugs by means of passages $b^1$ and $b^2$ is transferred directly to the plug shoe P since the ends of the plugs rest in recesses 95 formed in this shoe and is from thereon transmitted to the valve.

From the foregoing it will be seen that plug spring 91 is somewhat locked in operative position between member 131 and the pin 132. The end of member 90, which is the vertical and cylindrical part of the plug spring, is preferably regulated by the temperature control device already described and explained. End 90 constitutes substantially a fixed end so far as the deflection of spring 91 is concerned. Adjusting screw 140, shown clearly in Figs. 10 and 3, may be used to secure one of several working adjustments:

1. With a fairly stiff working spring 91 the lower end 141 of member 140 is preferably adjusted so that it just contacts with the upper surface of 91 when the valve has expanded about its full amount due to the absorption of heat in coming up to various working conditions. Before contact is made, the spring acts on the basis of being a cantilever. After contact has been made, the spring now acts as a beam supported at one end and fixed at the other, and any further expansion will then be carried by a thrust resulting from a slight deflection produced in the spring.

2. If for any reason the spring has been designed insufficiently strong to resist the suction thrust on the valve, as previously described and explained, member 140 may be adjusted to give such additional downward thrust as is necessary to counteract the upward lift due to the lower pressure in the intake manifold. Under these conditions the spring produces a slight initial pressure downward on the valve.

3. The third use to which 140 may be put is as follows: With a spring whose strength is intermediate between the cases 1 and 2, it would naturally be desirable to adjust 140 so that it would just contact with the spring 91 in the cold state, but not to produce any initial pressure thereon. The rise due to expansion of the valve is now carried by a slight deflection of the spring, which, of course, yields a downward thrust onto the plug shoe P.

In Fig. 10 are indicated two rings 103 and 104 on plug 102. The same construction, of course, applies to plug 101. These rings serve to prevent the escape of the balancing gases past the plug and thence into the manifold cap M, which action would be undesirable. In view of this arrangement, it is possible to give to the plugs 101 and 102 a slight working clearance without danger of any appreciable escape of gas.

The top ends of balance chambers P¹ and P² are closed by caps 106 to the underside of which is fastened a cylindrical member 107 whose lower surface 108 is made slanting. This arrangement, as is clearly shown in Figs. 10 and 3, leaves a small space 109 between the top of the plug and the member which fills the upper part of the plug chamber. This region 109 receives the balancing pressure gases and diverts them effectively onto the top of the balance plug and also results in a smaller volume in the balancing conduit than would result in the event that 108 were made parallel to the top surface of the plug.

The top areas of the plugs 101 and 102 are made of sufficient size so that the pressure transmitted on top of the valve will counteract the pressure coming on to the frusto-conical wall of the valve by way of ports P¹ and P², the action of which produces a vertical lifting effect during the combustion, expansion and exhaust strokes of the motor. From these means it is evident that the valve can be balanced synchronously with changes of pressure in the cylinder during these three strokes, whereas the suction lifting effect is provided for, as previously described and explained, by the special devices already enumerated.

To facilitate the assembly of the manifold cap M, it is desirable to have the plug shoe fastened to the plugs so that no difficulty can be experienced in getting the lower ends of the plugs 101 and 102 to fit into the recesses 95 in the top of the balance plug shoe P. This is secured by means of two screws 150 and 151 which lock the plugs to the shoe P, as is clearly indicated in Fig. 14. Holes 152 and 153 are drilled down close to the bottom of each plug, and thus the screw connection made. These holes are then plugged up by means of screws 154 and 155 so as to eliminate the otherwise extra space to be occupied by the balancing pressure gases.

What is claimed is:

1. An internal combustion motor comprising a cylinder, a valve chamber adjacent the cylinder and communicating therewith, a conical valve in the chamber, means for rotating the valve, means for normally maintaining the valve on its seat governed in accordance with changes of pressure in the cylinder, and independent means for maintaining the valve on its seat automatically governed in accordance with variations in temperature of the valve.

2. An internal combustion motor comprising a valve chamber, a cylinder, a port affording communication between the chamber and cylinder, a conical valve in the chamber, means for rotating the valve, means for exerting axial pressure on the valve in accordance with changes in pressure in the cylinder to maintain the valve on its seat, means for independently maintaining the valve on its seat, and mechanism for automatically adjusting the independent means in accordance with variations in temperature.

3. An internal combustion motor comprising a cylinder, a valve chamber communicating therewith, a conical valve in the chamber, means for rotating the valve, a pressure shoe located adjacent the large end of the valve, means for yieldingly communicating axial pressure to the valve through the shoe, having provision for adjustment, and independent means for communicating pressure to the valve varying synchronously with variations in pressure in the cylinder.

4. An internal combustion motor comprising two adjacent cylinders, a valve chamber in proximity to the cylinders and communicating therewith, a conical valve in the chamber, means for rotating the valve, means located adjacent the large end of the valve for maintaining the valve on its seat with a pressure which changes synchronously with the pressure in the cylinders, and means for varying the pressure upon the large end of the valve in accordance with variations in temperature.

5. An internal combustion motor comprising a cylinder, a valve chamber adjacent thereto and communicating therewith, a conical valve in the chamber, means adjacent the large end of the valve for normally maintaining axial pressure thereon governed in accordance with changes in pressure in the cylinder, means for rotating the valve, a rotary shaft, a shaft connected with the valve, a spring connecting the two shafts to cause them to normally rotate in unison, and means for lifting the valve shaft with respect to the driving shaft when the distortion of the spring exceeds a predetermined amount to ease the valve from its seat.

6. An internal combustion motor comprising a cylinder, a valve chamber adjacent thereto and communicating therewith, a conical valve in the chamber, means adjacent the large end of the valve for maintaining axial pressure thereon, means for rotating the valve, a shaft connected to the valve, a driving shaft, a collar connected to each shaft, a spring connecting the collars to cause them to normally rotate in unison, means for separating the shafts in endwise direction when the distortion of the spring exceeds a predetermined amount, and means for adjusting the relative rotative positions of the shafts to initially vary the timing of the valve.

7. An internal combustion motor comprising a cylinder, a valve chamber adjacent thereto and communicating therewith, a conical valve in the chamber, means adjacent the large end of the valve for maintaining axial pressure thereon, means for rotating the valve, a shaft connected to the valve, a cooperating driving shaft, a collar secured to each shaft, an inclined face mounted on the collar, a cantilever spring normally connecting the shafts in driving relation, a threaded abutment connected to the collar on the valve shaft and cooperating with the inclined face mounted on the opposing collar to impart a relative endwise movement to the two shafts upon distortion of the spring, caused by a relative rotation of the shafts.

8. An internal combustion motor comprising a cylinder, a valve chamber communicating therewith, a conical valve in the chamber, and means for rotating the valve, a head connected to the upper end of the valve, a pressure shoe bearing upon the head having a series of inclined faces to provide for the retention of an oil film, and means for applying pressure to the shoe in a manner to maintain the valve upon its seat.

9. An internal combustion motor comprising a cylinder, a valve chamber communicating therewith, a conical valve in the chamber, and means for rotating the valve, a pressure disk adapted to transmit axial pressure to the valve, a pressure plug engaging with the disk, means for affording free communication between the plug and the cylinder to apply pressure to the plug synchronously with changes in pressure in the cylinder, and independent means having provision for adjustment for applying an independent pressure to the disk.

10. An internal combustion motor comprising adjacent cylinders, a valve chamber communicating therewith, a conical valve rotating in the chamber, a pressure disk adapted to transmit axial pressure to the valve, two pressure plugs engaging with the disk, means affording free communication between the plugs and the cylinders to apply pressure to the plug synchronously with changes in pressure in the cylinders, and independent temperature control mechanism for applying a yielding axial pressure to the disk.

11. An internal combustion motor comprising a cylinder, a valve chamber communicating therewith, a conical valve rotating in the chamber, a pressure shoe adapted to transmit axial pressure to the valve, a pressure spring for transmitting pressure to the shoe, a temperature control member positioned in proximity to the exhaust manifold extending lengthwise thereof, and connections between the temperature control member and the pressure spring for adjusting the position of the spring in accordance with variations in temperature of the control member.

In testimony whereof I have signed my name to this specification.

GUY B. COLLIER